(12) United States Patent
Ramun

(10) Patent No.: US 9,044,815 B2
(45) Date of Patent: Jun. 2, 2015

(54) KEYLESS COUPLING ARRANGEMENT

(76) Inventor: John R. Ramun, Poland, OH (US)

( * ) Notice: Subject to any disclaimer, the term of this patent is extended or adjusted under 35 U.S.C. 154(b) by 872 days.

(21) Appl. No.: 13/139,589

(22) PCT Filed: Dec. 18, 2008

(86) PCT No.: PCT/US2008/087396
§ 371 (c)(1),
(2), (4) Date: Jul. 13, 2011

(87) PCT Pub. No.: WO2010/071648
PCT Pub. Date: Jun. 24, 2010

(65) Prior Publication Data
US 2011/0262218 A1    Oct. 27, 2011

(51) Int. Cl.
| | |
|---|---|
| *F16D 1/00* | (2006.01) |
| *B23D 31/00* | (2006.01) |
| *E02F 3/96* | (2006.01) |
| *E02F 9/00* | (2006.01) |
| *E04G 23/08* | (2006.01) |
| *F16C 11/04* | (2006.01) |
| *B23D 17/00* | (2006.01) |

(52) U.S. Cl.
CPC ............ *B23D 31/008* (2013.01); *Y10T 403/635* (2015.01); *B23D 17/00* (2013.01); *E02F 3/965* (2013.01); *E02F 9/006* (2013.01); *E04G 23/08* (2013.01); *F16C 11/045* (2013.01)

(58) Field of Classification Search
CPC ..................................................... F16B 5/0052
USPC .......................................... 403/381, 315–324
See application file for complete search history.

(56) References Cited

U.S. PATENT DOCUMENTS

| | | | |
|---|---|---|---|
| 3,875,641 A | 4/1975 | Gregg | |
| 4,090,796 A * | 5/1978 | Okuda et al. .................... | 403/24 |
| 4,403,431 A | 9/1983 | Ramun et al. | |
| 4,437,364 A | 3/1984 | Martinmaas | |
| 5,649,600 A | 7/1997 | Marsh | |
| 5,697,257 A | 12/1997 | Oh | |
| 5,913,781 A * | 6/1999 | Vidmar et al. .................. | 52/102 |
| 6,139,001 A | 10/2000 | Buck | |
| 6,374,521 B1 | 4/2002 | Pippins | |
| 6,926,217 B1 * | 8/2005 | LaBounty et al. ............ | 241/266 |
| 7,354,010 B2 | 4/2008 | Ramun et al. | |
| 7,937,838 B2 * | 5/2011 | Patton et al. .................... | 30/134 |
| 8,388,686 B2 | 3/2013 | Aebi et al. | |
| 2008/0063529 A1 | 3/2008 | Miller et al. | |
| 2010/0034582 A1* | 2/2010 | Howlett ........................ | 403/333 |

FOREIGN PATENT DOCUMENTS

WO    0168992 A1    9/2001

* cited by examiner

*Primary Examiner* — Victor MacArthur
(74) *Attorney, Agent, or Firm* — The Webb Law Firm

(57) ABSTRACT

A dovetail coupling arrangement is disclosed for securing two removable parts along a coupling axis. The dovetail coupling arrangement includes multiple opposing surfaces between the receiver of a first member and the projection of a second member to provide resistance to forces transmitted in a direction orthogonal to the coupling axis. Such an arrangement may be utilized for jaw sets associated with hydraulic construction, demolition, and scrap handling equipment.

27 Claims, 8 Drawing Sheets

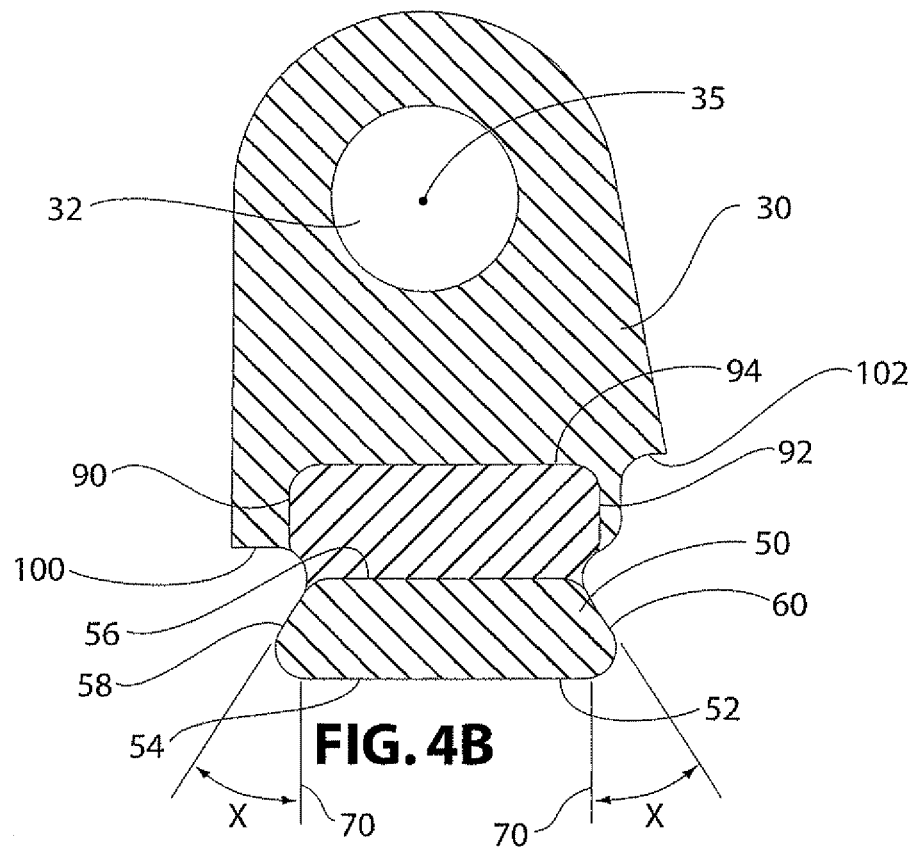
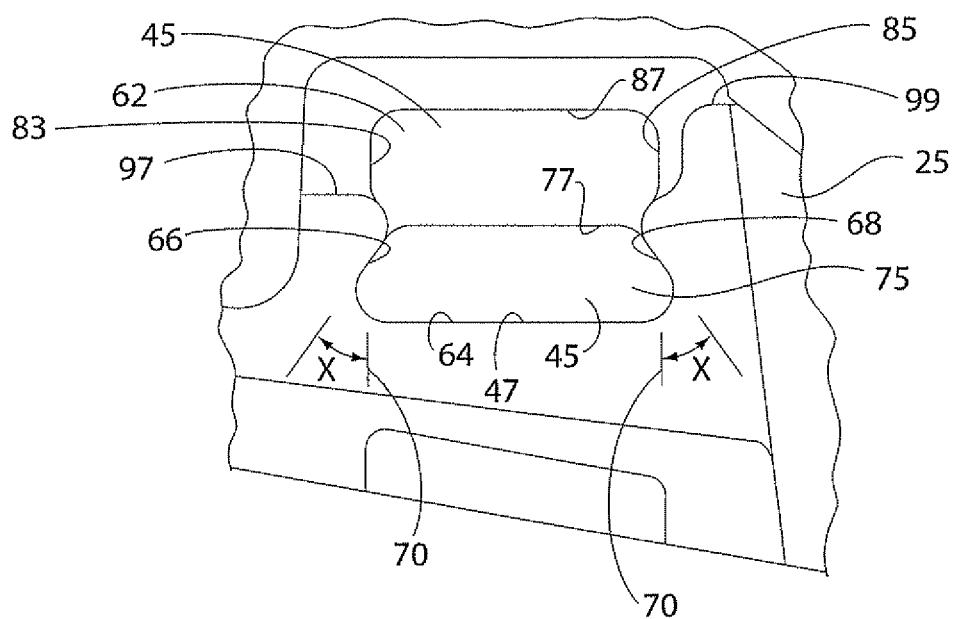

KEYLESS COUPLING ARRANGEMENT

BACKGROUND OF THE INVENTION

1. Field of the Invention

The present invention relates to a keyless coupling arrangement for sliding two parts together to form a single unit.

2. Description of Related Art

While the discussion hereinafter will make reference to construction equipment, such equipment is also referred to as demolition equipment, scrap handling equipment, and the like. The description of construction equipment is not intended to be restrictive of the equipment being referenced. Demolition equipment, such as heavy-duty metal cutting shears, plate shears, claws, hammers, buckets, grapples, and concrete crushers have been mounted on backhoes powered by hydraulic cylinders for a variety of jobs in the demolition field. This equipment provides for the efficient cutting and handling of scrap. For example, in the dismantling of an industrial building, metal scrap in the form of various diameter pipes, structural I-beams, channels, angles, sheet metal plates, and the like, must be efficiently severed and handled by heavy-duty metal shears. Such metal shears can also be utilized for reducing automobiles, truck frames, railroad cars, and the like. The shears must be able to move and cut the metal scrap pieces regardless of the size or shape of the individual scrap pieces and without any significant damage to the shears. In the demolition of an industrial building, concrete crushing devices, such as a concrete pulverizer or concrete cracker, are also used to reduce the structure to manageable components which can be easily handled and removed from the site. A grapple is often utilized where handling of debris or work pieces is the primary function of the equipment. Historically, all of these pieces of equipment represent distinct tools having significant independent capitol costs.

Each of these tools utilizes a jaw set pivotal about a pivot axis. Each of these jaw sets may be subjected to forces developed or generated on the magnitude of between less than 1 ton to more than 10,000 tons and, as a result, it is imperative that each of the jaws in the jaw set is fabricated, shaped, or cast to withstand such forces. However, certain jaw set designs may preferably require a portion of the jaw set to be disassembled in order to capture the pivot shaft between the lower jaw and the upper jaw. In the past, such a coupling arrangement was achieved by sliding the hub into the anvil and then inserting removable keys along the direction of insertion/removal to secure the anvil and the hub relative to one another. While this adequately secured the hub within the anvil, it is a relatively labor intense practice and, furthermore, the stress forces produced by this coupling tend to be concentrated within the keys such that there is not an equal stress distribution over the anvil and the hub.

A design is needed to slideably secure a hub within an anvil, whereby the design is relatively simple but, at the same time, eliminates the need for keys and provides effective redistribution of the stresses, such that localized forces are reduced and the stresses overall are more evenly distributed among the unified hub/anvil.

SUMMARY OF THE INVENTION

One embodiment of the invention is directed to a dovetail coupling arrangement for securing two removable parts along a coupling axis which are supporting segments of a shaft having a shaft axis. The coupling arrangement is suited to resist translational forces orthogonal to the coupling axis and has a first part having a receiver extending along the coupling axis, wherein the coupling axis is parallel to the shaft axis and, wherein the receiver has an inner wall with a receiver wall. The arrangement also has a second part with a projection extending along the coupling axis and an outer wall with a projection wall profile. A substantial portion of the outer wall of the projection corresponds to the inner wall of receiver, such that the projection mates with the receiver with a slip fit. The receiver and the projection define mating interlocking walls along the coupling axis to restrict movement of the projection within the receiver along directions orthogonal to the coupling axis.

A second embodiment of the invention is directed to a dovetail coupling arrangement for securing two removable parts along a coupling axis, wherein the coupling arrangement is suited to resist translational forces orthogonal to the longitudinal axis. The arrangement has a first part with a receiver extending along the coupling axis, wherein the receiver has an inner wall with a receiver wall. The arrangement also has a second part with a projection extending along the coupling axis and an outer wall with a projection wall. A substantial portion of the outer wall of the projection corresponds to the inner wall of receiver such that the projection mates with the receiver with a slip fit. The receiver and the projection define mating interlocking walls along the coupling axis to restrict movement of the projection within the receiver along directions orthogonal to the coupling axis. A removable shaft extends within the first part and the second part. The shaft is oriented in a direction generally orthogonal to the longitudinal axis to prevent relative movement between the first part and the second part along the coupling axis.

BRIEF DESCRIPTION OF THE DRAWINGS

FIG. 4A is a view of a section of the anvil along arrows 4A-4A in FIG. 2;

FIG. 4B is a cross-section view of the hub along arrows 4B-4B in FIG. 2;

DESCRIPTION OF THE PREFERRED EMBODIMENTS

Figure 1:
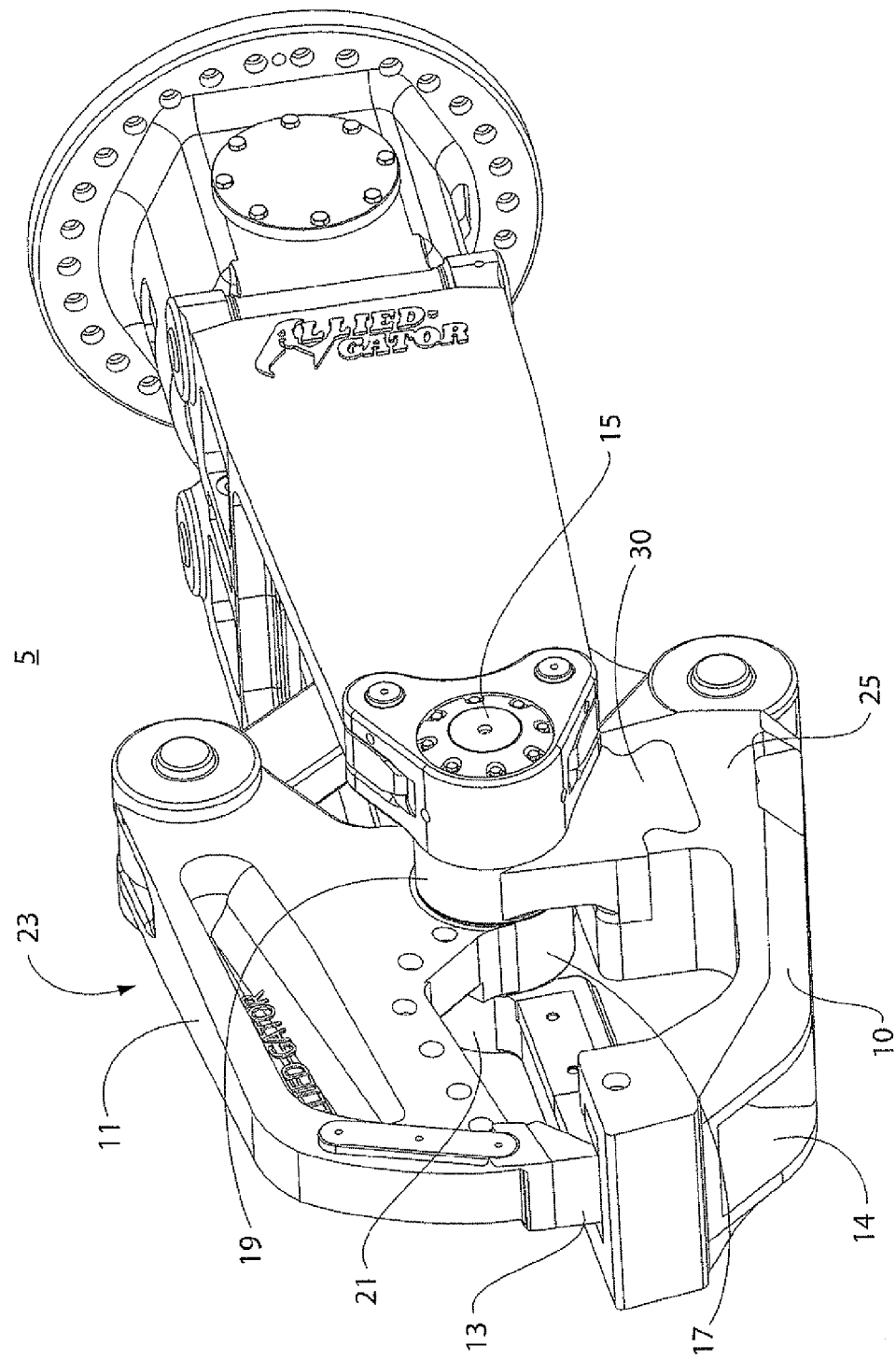
FIG. 1 is a perspective view of a hydraulically operated jaw utilizing a hub and anvil in accordance with the subject invention.

For purposes of explaining the subject invention, an attachment 5 used for demolition may be associated with a hydraulic excavator (not shown) and includes a pair of movable jaws 10, 11 which pivot about a main shaft 15. In operation of the embodiment illustrated in FIG. 1, the jaw 11 and the jaw 10 pivot toward one another, such that the tip 13 of jaw 11 passes through the opening 14 of jaw 10.

Jaw 11 includes a jaw portion 17 having a bore extending therethrough, which pivots about the main shaft 15. Furthermore, jaw 10 includes a jaw portion 19 and a jaw portion 21 which also have a bore (not shown) extending therethrough pivoting about the main shaft 15.

Generally speaking, the main shaft 15 and the jaw 10 and jaw 11 pivoting thereabout define a jaw set 23.

FIG. 1 illustrates a heavy-duty metal cutting shear, whereby the jaw set 23 is made up of a jaw 11, which has a tip 13 that passes through the opening 14 of jaw 10 when the jaws 10, 11 are closed. While this is one type of jaw set 23, it should be appreciated that other jaw sets exist, and the subject invention may be applied to these jaw sets as well. In particular, the subject invention may be applied to jaw sets associated with concrete crushers, where the two opposing jaws have tips that abut with one another when the jaws come together or associated with grapples, which have two opposing jaws, each with tines that interlock with one another when the jaws come together. Overall, any discussion of jaw sets should not be limited to the functions of a particular jaw set, but should focus upon the arrangement by which the two opposing jaws are connected.

In order to assemble or disassemble the jaw set 23, it may preferably be necessary to disassemble the jaw 10. In particular, the jaw 10 is comprised of an anvil 25 and a hub 30 that is secured within the anvil 25. It is this coupling arrangement between the anvil 25 and the hub 30 to which the subject invention is directed.

Although the following discussion will be directed to the hub 30 secured within the anvil 25 in the context of a jaw set 23 associated with demolition equipment 5, it should be appreciated that this coupling arrangement has a wide range of applications and, therefore, should not be limited to the particular application discussed herein.

Figure 2:
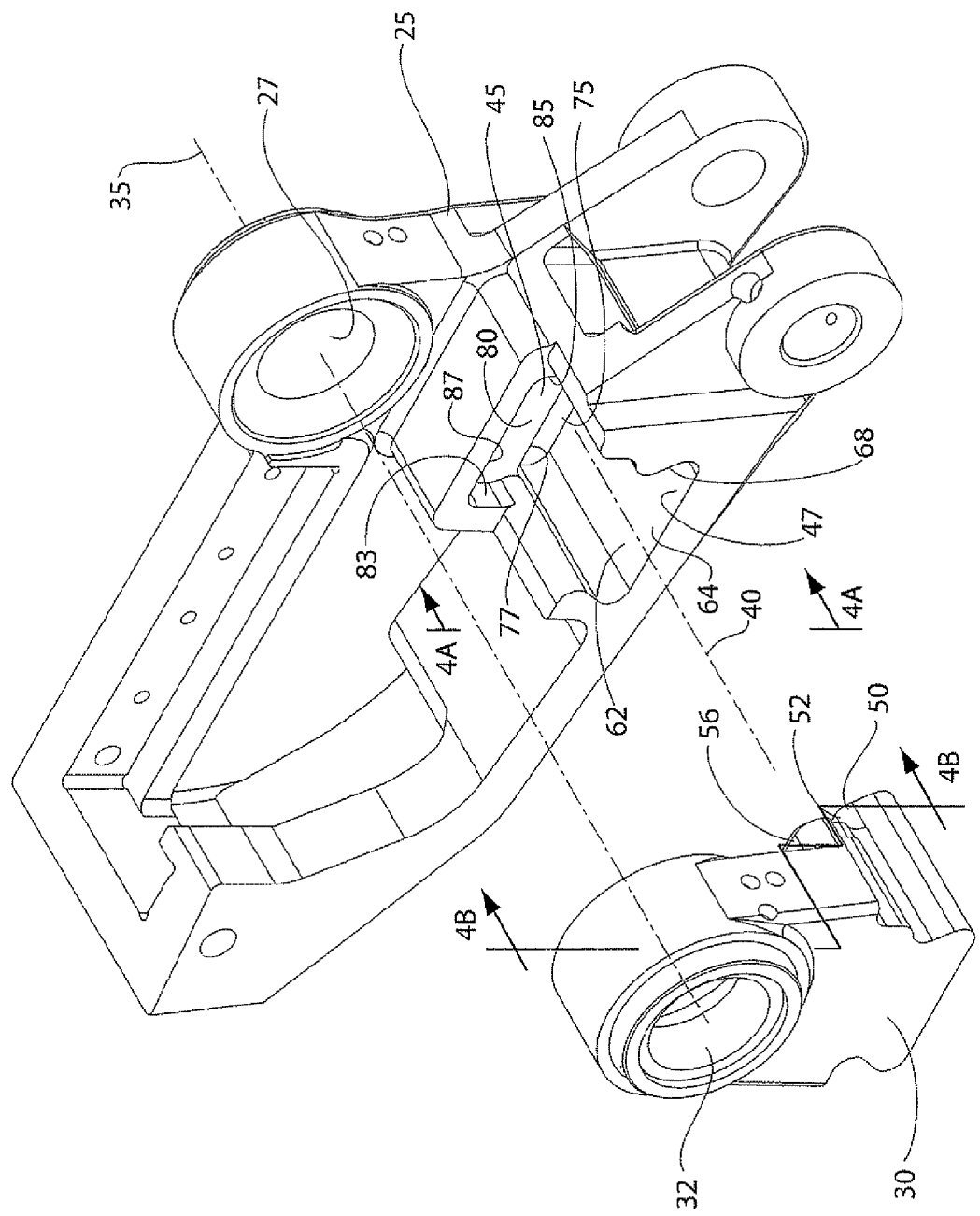
FIG. 2 is an exploded perspective view of the hub and anvil in accordance with the subject invention.
Figure 3:
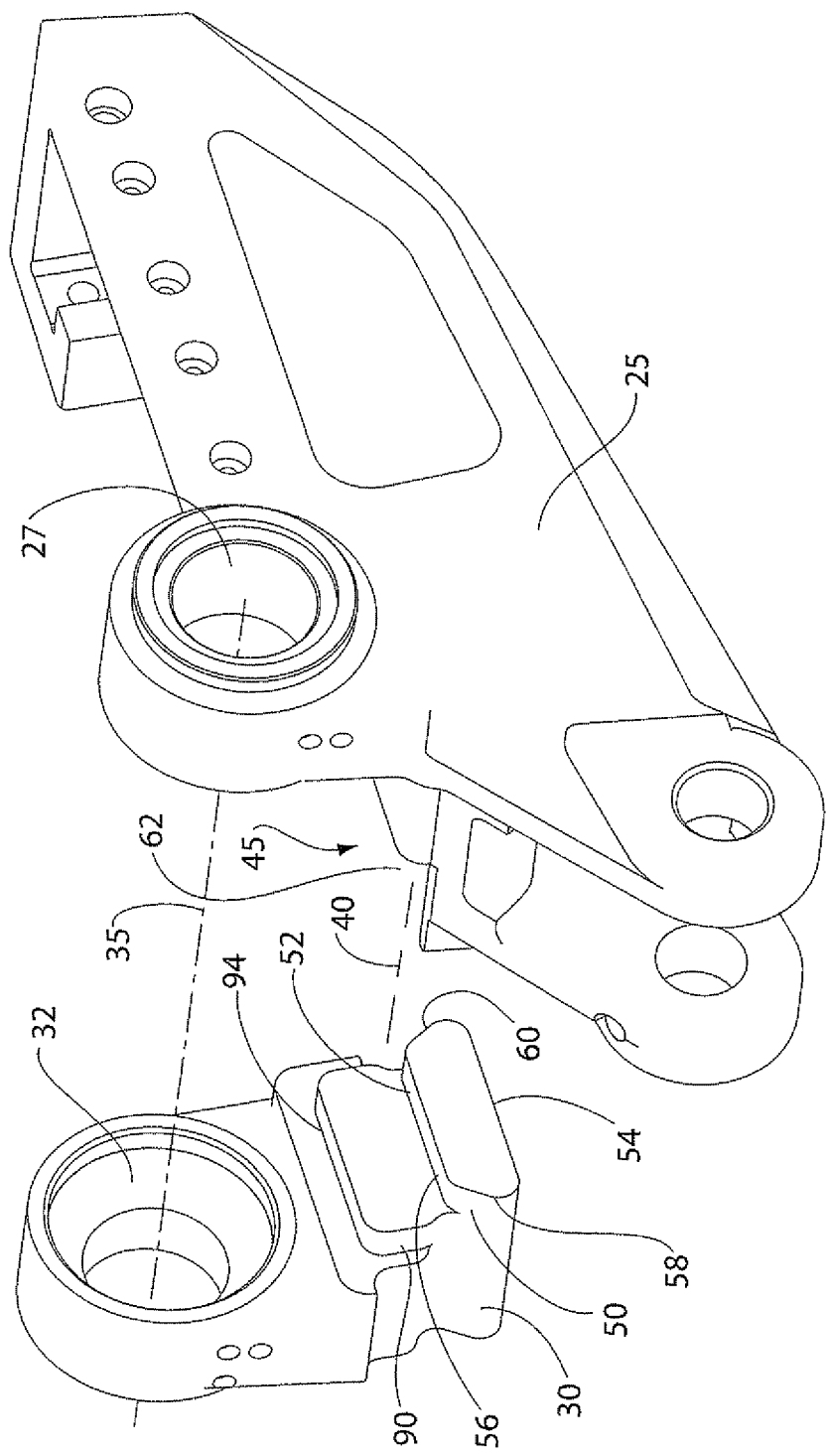
FIG. 3 is a different exploded perspective view of the hub and anvil in accordance with the subject invention.

FIGS. 2 and 3 illustrate exploded views of the hub 30 relative to the anvil 25, which are shown in their assembled state in FIG. 1.

For ease in understanding this configuration, FIGS. 2, 3, 4A, and 4B will be discussed together.

As mentioned, the subject invention is directed to a coupling arrangement for removably securing the hub 30 within the anvil 25. At least with respect to this arrangement, the hub 30 has a bore 32 extending therethrough and the anvil 25 has a bore 27 extending therethrough along a shaft axis 35. The hub 30 slides within the anvil 25 along a coupling axis 40. The coupling arrangement is suited to resist translational forces orthogonal to the coupling axis 40.

The anvil 25 has a receiver 45 extending along the coupling axis 40. As illustrated in FIGS. 2 and 3, the coupling axis 40 may be parallel to the shaft axis 35. The receiver 45 has an inner wall 47 with a receiver wall profile. The hub 30 has a projection 50 extending along the coupling axis 40 and an outer wall 52 with a projection wall profile. A substantial portion of the outer wall 52 of the projection 50 corresponds to the inner wall 47 of the receiver 45, such that the projection 50 mates with the receiver 45 with a slip fit such that the projection 50 is slidably receivably and directly connected to the receiver 45. The receiver profile and the projection profile define mating interlocking walls 47, 52 along the coupling axis 40 to restrict movement of the projection 50 within the receiver 45 along directions orthogonal to the coupling axis 40.

Directing attention to FIGS. 4A and 4B, when viewed along the coupling axis 40 from the end of the projection 50 (along arrows 4B-4B), the profile of the projection 50 has a dovetail shape (FIG. 4B) with a bottom outer surface 54 and a primary outer top surface 56. The bottom outer surface 54 and the primary top outer surface 56 are connected by opposing outer angled walls 58, 60. On the other hand, the receiver 45 has an open section 62 with an inner bottom surface 64 and opposed inner angled walls 66, 68 extending upwardly therefrom, such that when the anvil 25 and the hub 30 are mated, the bottom outer surface 54 and the outer angled walls 58, 60 of the projection 50 are engaged with the inner bottom surface 64 and the inner angled walls 66, 68 of the receiver 45.

As seen from an inspection of FIGS. 4A and 4B, the outer angled walls 58, 60 of the projection 50 and the inner angled walls 66, 68 of the receiver 45 extend upwardly and inwardly at a dovetail angle X of between 40 and 70 degrees, with respect to a line 70. The line 70 extends perpendicular to the outer bottom surface 54 of the projection 50 and the inner bottom surface 64 of the receiver 45. In a preferred embodiment, the dovetail angle X is approximately 57 degrees.

The receiver 45, in a region adjacent to the open section 62, further includes a primary enclosed section 75 formed with the inner bottom surface 64 and the opposing inner angled walls 66, 68 common with the open sections 62 and, additionally, includes a primary inner top surface 77 connecting the inner angled walls 66, 68, thereby mating the anvil 25 with the hub 30. Additionally, the primary outer top surface 56 of the projection 50 is engaged with the primary inner top surface 77 of the receiver 45.

As illustrated in FIGS. 2, 3, 4A, and 4B, the receiver 45 further includes, along at least a portion of depth of the receiver 45, a secondary enclosed section 80 formed by the inner bottom surface 64 and the inner opposing angled walls 66, 68 with the open section 62 and additionally includes opposing inner extension walls 83, 85 extending from the dovetail shape of the receiver 45 and connected by a secondary inner top surface 87. The profile of the projection 50 further includes matching opposing outer extension walls 90, 92 extending upwardly from the dovetail shape of the projection 50 and connected by a secondary outer top surface 94, such that when the anvil 25 and the hub 30 are mated, the opposing inner extension walls 83, 85 and the secondary inner top surface 87 of the receiver 50 mate with the opposing outer extension walls 90, 92 and the second outer top surface 94 of the projection 50.

The open section 62 of the receiver 45 may further include inner horizontal segments 97, 99 extending from the dovetail shape and, wherein the projection 50 further includes outer horizontal segments 100, 102 extending from the outer dovetail shape of the projection, such that when the anvil 25 is mated with the hub 30, the inner horizontal surface 97 and inner horizontal surface 99 rest upon the outer horizontal surface 100, 102, respectively.

As illustrated in FIGS. 4A and 4B, the multitude of inner surfaces associated with the receiver 45 and outer surfaces associated with the projection are connected to adjacent surfaces with transition segments that are curved to eliminate sharp edges that may increase stress concentrations.

So far discussed have been the surfaces between the receiver 45 and the projection 50 that prevent translation in a direction orthogonal to the coupling axis 40. However, it is also necessary to restrain the hub 30, with respect to the anvil 25, in the direction of the coupling axis 40, even though the primary force is experienced by the anvil/hub assembly will be in a direction different than that of the coupling axis 40.

Figure 5:
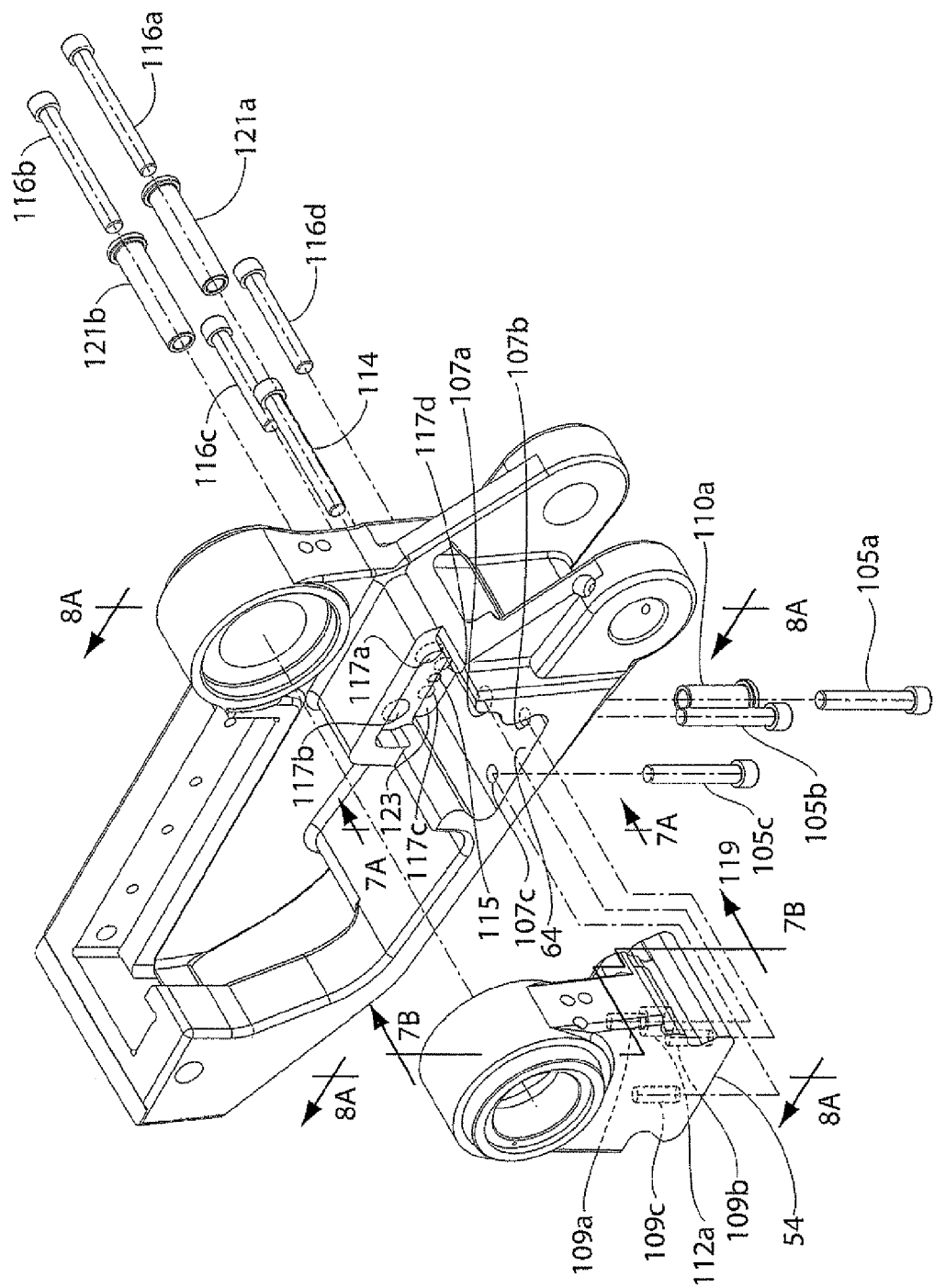
FIG. 5 is an exploded perspective view similar to FIG. 2 but with securement bolts included.
Figure 6:
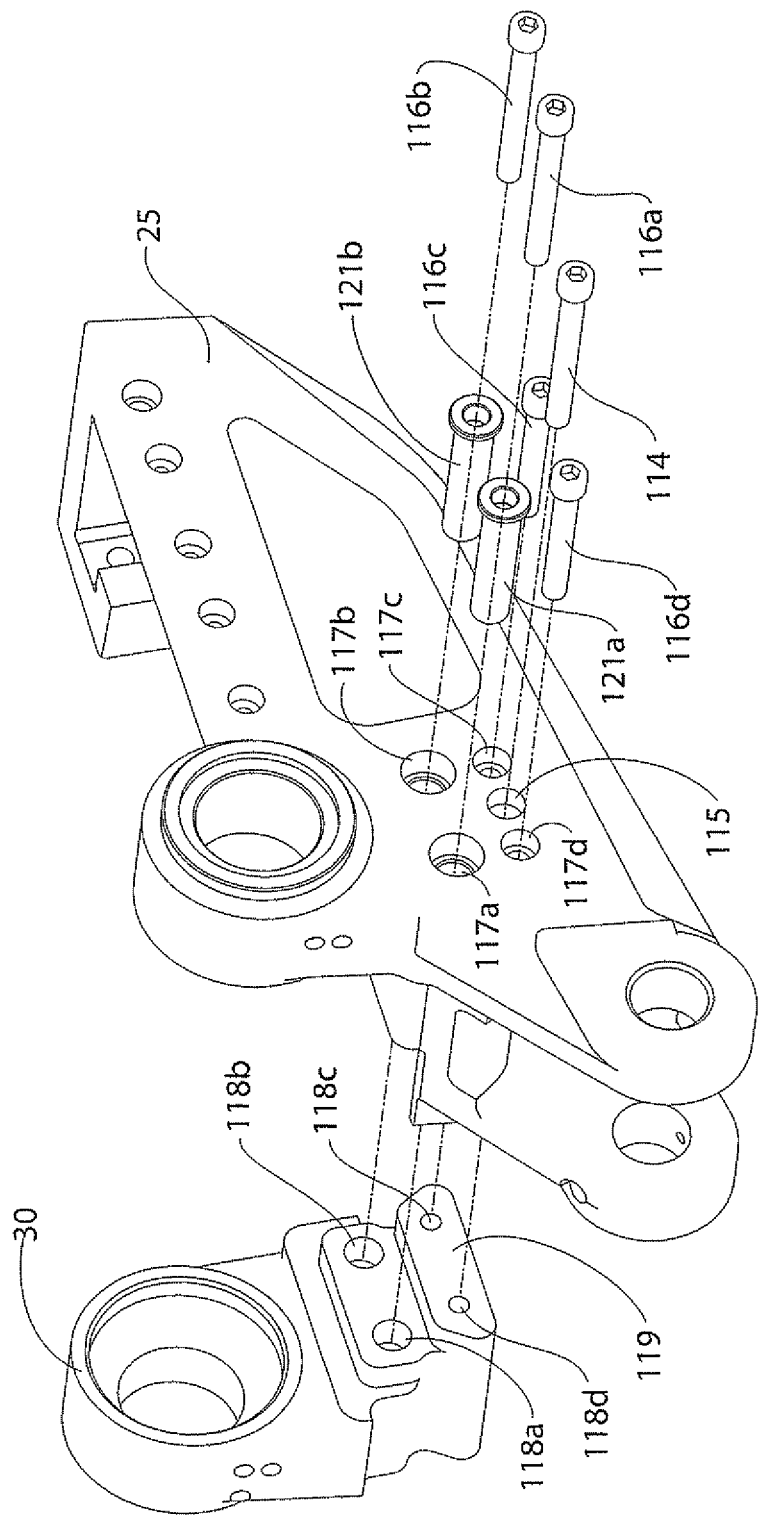
FIG. 6 is an exploded perspective view similar to FIG. 3 but with securement bolts included.
Figure 7B:
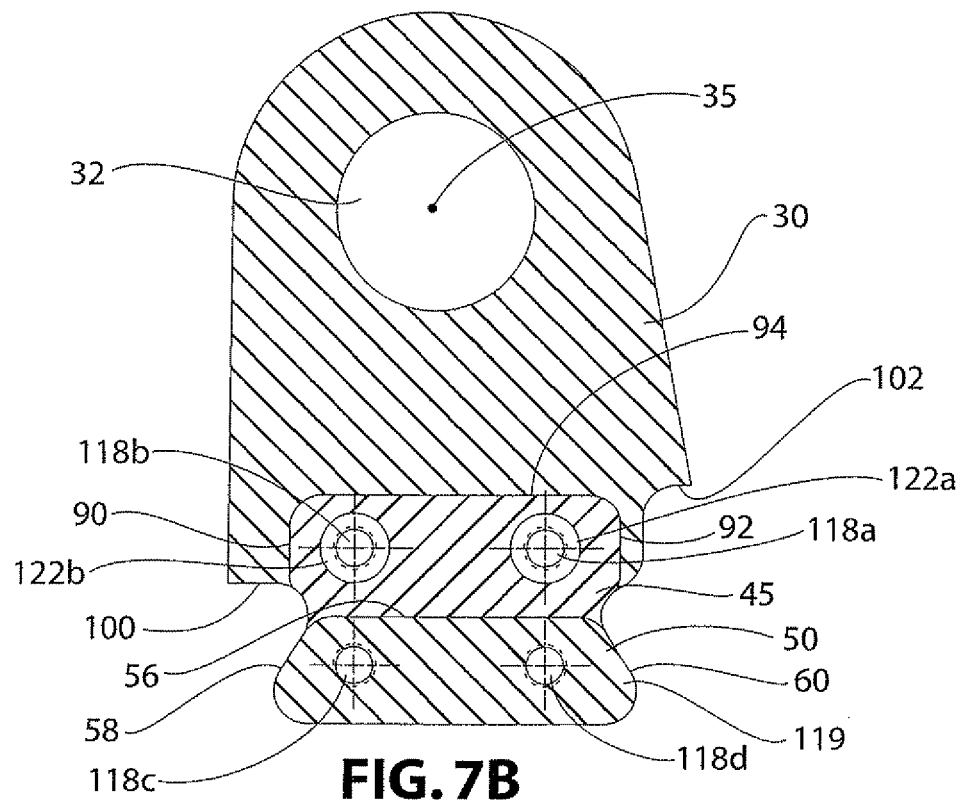
FIG. 7B is a cross-section view of the hub along arrows 7B-7B in FIG. 5.
Figure 7A:
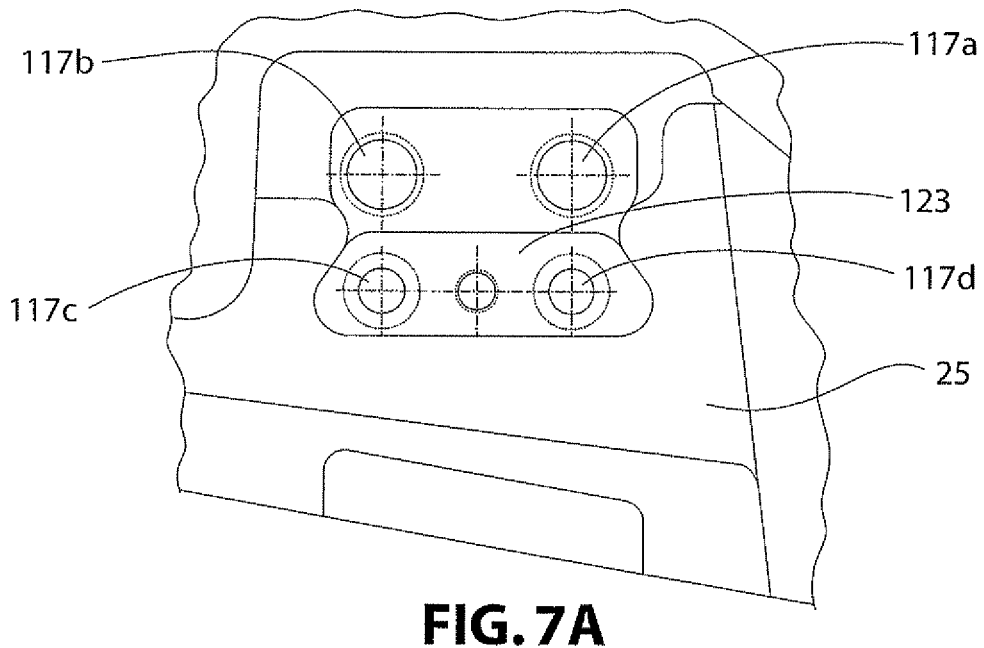
FIG. 7A is a view of a section of the anvil along arrows 7A-7A in FIG. 5.

Directing attention to FIGS. 5, 6, 7A, and 7B, to secure the hub 30 within the anvil 25 along the coupling axis 40, one or more bolts 105*a*, 105*b*, 105*c* extend through the inner bottom surface 64 through bores 107*a*, 107*b*, 107*c* and into matching bores 109*a*, 109*b*, 109*c*, which are threaded, extending into the outer bottom surface 54 of the hub 30 to secure the hub 30 within the anvil 25 along the coupling axis 40. As illustrated in FIG. 5, the bolt 105*a* may further include a sleeve 110*a* which extends through the bore 107*a* of the anvil 25 and into an enlarged diameter portion of the bore 109*a* of the hub 30 so that any shear loads produced between the hub 30 and the anvil 25 will be absorbed by the sleeve 110*a*, which has a greater cross-sectional area than the bolt 105*a* associated therewith. The bore 109*a* has an enlarged diameter portion 112*a* adjacent to the outer bottom surface 54 to accommodate the sleeve 110*a*. This enlarged diameter is not threaded. The threaded portion of the bore 109*a* begins beyond the enlarged diameter portion 112*a*. In addition to providing additional cross-sectional area to absorb shear forces, the sleeve 110*a* is also used to properly align the hub 30 within the anvil 25 prior to securing the bolts 105*a*, 105*b*, 105*c* within their respective bores 109*a*, 109*b*, 109*c*. Once secured within their respective bores, the bolts 105*b*, 105*c* and the sleeve 110*a* absorb shear forces but, furthermore, the bolts 105*a*, 105*b*, 105*c* retain the outer bottom surface 54 of hub 30 against the inner bottom surface 64 of the anvil 25 to minimize any twisting of the hub 30 within the anvil 25.

Additionally, to secure the hub 30 within the anvil 25, bolts 116*a*, 116*b*, 116*c*, 116*d* extend through bores 117*a*, 117*b*, 117*c*, 117*d* within the anvil 25 and into threaded bores 118*a*, 118*b*, 118*c*, 118*d* within the hub 30. Sleeves 121*a*, 121*b*, associated with bolts 116*a*, 116*b*, fit within enlarged diameter portions 122*a*, 122*b* extending inwardly into the threaded bores 118*a*, 118*b* and with bolts 116*c* and 116*d* to provide additional cross-sectional area to resist shear forces in a direction perpendicular to the coupling axis 40. Furthermore, all of the bolts 116*a*, 116*b*, 116*c*, 116*d* pull the front wall 119 of the hub 30 against the back wall 123 of the receiver 45 to provide additional stability to the projection 50/receiver 45 coupling.

Figure 8B:
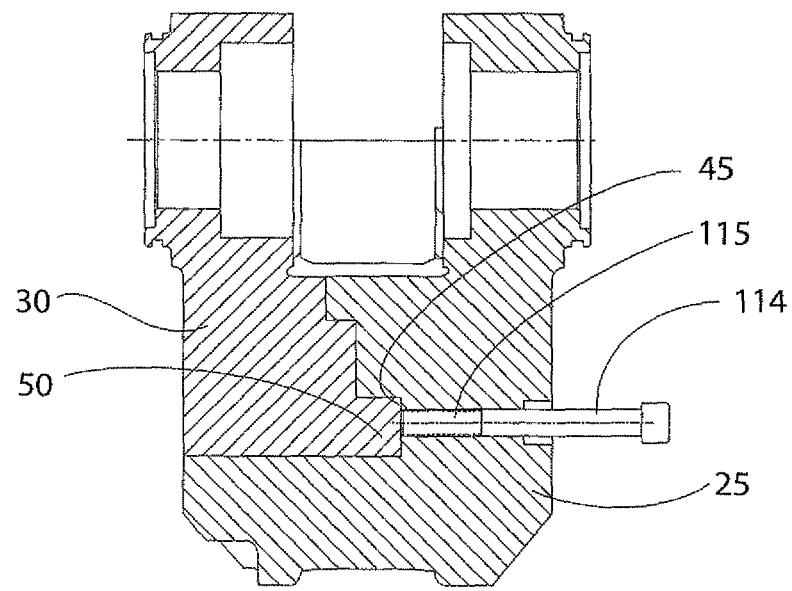
FIG. 8B is an assembled view of the arrangement illustrated in FIG. 8A.
Figure 8A:
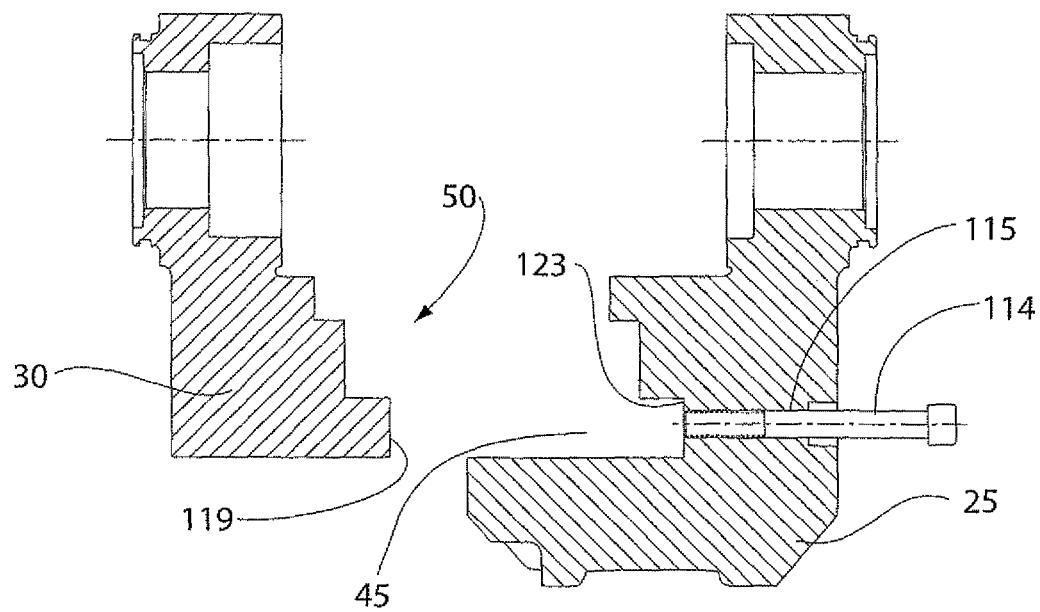
FIG. 8A is an exploded cross-sectional view of the assembled hub/anvil along the plane defined by arrows 8A-8A in FIG. 5.

In order to disassemble the hub 30 from the anvil 25, it is necessary to push the projection 50 of the hub 30 from the receiver 45 of the anvil 25. To achieve this, an ejection bolt 114 (FIGS. 5, 8A, 8B) extends through a threaded bore 115 through the back wall 123 of the receiver 45. The threaded bore 115 is aligned with the front wall 119 of the projection 50. With all of the bolts 105*a*, 105*b*, 105*c*, 116*a*, 116*b*, 116*c*, 116*d* and all of the sleeves 110*a*, 121*a*, 121*b* removed from their respective bores, the ejection bolt 114 may be advanced within the threaded bore 115 against the front wall 119 of the projection 30 to urge the projection 50 from the receiver 45, thereby separating the hub 30 from the anvil 25.

As mentioned, the projection 50 has a front wall 119 and the receiver has a back wall 123, wherein the receiver back wall 123 and the projection front wall 119 face one another. While what has been described is the ejection bolt 114 acting against the front wall 119 of the projection 50, it is entirely possible for the ejection bolt 114 to extend through the hub and act upon the back wall 123 of the receiver 45.

The embodiments so far discussed are directed to a single hub 30 with a projection 50. The projection 50 is mounted within a receiver 45 of an anvil. It should be understood that more than one hub may be mounted to a single anvil. As an example, and directing attention to FIG. 5, it is possible to form an additional receiver on the opposite side of the anvil 25 to accept a projection 50 on the opposite side of the anvil 25. Under the circumstances, more than one hub may be mounted upon a single anvil.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A dovetail coupling arrangement for securing two removable parts along a coupling axis which are supporting segments of a shaft having a shaft axis, wherein the coupling arrangement is suited to resist translational forces orthogonal to the coupling axis, the arrangement comprising:
   a) a first part having a bore extending along the shaft axis to accept the shaft and having a receiver extending along the coupling axis, wherein the coupling axis is parallel to the shaft axis and wherein the receiver has an inner wall with a receiver wall profile;
   b) a second part having a bore extending along the shaft axis to accept the shaft and having a projection extending along the coupling axis and an outer wall with a projection wall profile, wherein a substantial portion of the outer wall of the projection corresponds to the inner wall of receiver such that the projection mates with the receiver with a slip fit;
   c) wherein the receiver of the first part and the projection of the second part are slidably receivable and directly connected with one another and, wherein the receiver profile and the projection profile define mating interlocking walls along the coupling axis to restrict movement of the projection within the receiver along all directions orthogonal to the coupling axis and wherein the bore in the first part and the bore in the second part are adapted to accept and secure the shaft;
   d) wherein when viewed along the coupling axis from the end, the projection profile has a dovetail shape with an outer bottom surface and a primary outer top surface, wherein the bottom and outer top surfaces are connected by opposing outer angled walls and wherein the receiver has an open section with only an inner bottom surface and opposing inner angled walls extending upwardly therefrom such that when the first part and the second part are mated, only the bottom surfaces and opposing angled walls of the projection and the receiver are engaged; and
   e) wherein the receiver adjacent to the open section further includes a primary enclosed section with the inner bottom surface and the opposing inner angled walls common with the open section and additionally includes a primary inner top surface connecting the inner angled walls, wherein when the first part and the second part are mated, additionally the primary outer top surface of the projection is engaged with the primary inner top surface of the receiver.

2. The coupling arrangement according to claim 1, wherein each angled wall extends upwardly and inwardly at a dovetail angle with respect to a line extending perpendicular to the bottom surface of between 40 and 70 degrees.

3. The coupling arrangement according to claim 2, wherein the dovetail angle is approximately 57 degrees.

4. The coupling arrangement according to claim 1, wherein the receiver profile further includes along at least a portion of the depth of the receiver, a secondary enclosed section with the inner bottom surface and the inner opposing angled walls common with the open section and additionally opposing inner extension walls extending from the dovetail shape of the receiver and connected by a secondary inner top surface, wherein the projection profile further includes matching opposing outer extension walls extending upwardly from the outer dovetail shape connected by a secondary outer top surface such that when the first part and the second part are mated, the respective opposing extension walls and the secondary top surfaces engage one another.

5. The coupling arrangement according to claim 4, wherein the open section of the receiver further includes at least one inner horizontal segment extending from the inner dovetail shape and wherein the projection further includes at least one outer horizontal segment extending from the outer dovetail shape such that when the first part is mated with the second part, the respective horizontal surfaces rest upon on another.

6. The coupling arrangement according to claim 1, further including transition segments between inner surfaces on the receiver and outer surfaces on the projection and, wherein the transition segments are curved to eliminate sharp edges that increase stress concentrations.

7. The coupling arrangement according to claim 1, further including at least one bolt extending within both the first part and the second part in a direction orthogonal to the coupling axis to prevent relative movement between the first part and the second part along the coupling axis.

8. The coupling arrangement according to claim 7, further including at least one sleeve extending within both the first part and the second part in a direction orthogonal to the coupling axis to prevent relative movement between the first part and the second part along the shaft axis.

9. The coupling arrangement according to claim 8, wherein the at least one sleeve is coaxial with one bolt such that the bolt retains the sleeve in position.

10. The coupling arrangement according to claim 7, further including at least one bolt extending within both the first part and the second part in a direction parallel to the coupling axis.

11. The coupling arrangement according to claim 10, further including at least one sleeve extending within both the first part and the second part in a direction parallel to the coupling axis.

12. The coupling arrangement according to claim 11, wherein the at least one sleeve is coaxial with one bolt such that the bolt retains the sleeve in position.

13. The coupling arrangement according to claim 1, further including an ejection bolt parallel to the coupling axis for separating the first part from the second part when the first part and the second part are assembled.

14. The coupling arrangement according to claim 13, wherein the receiver has a back wall and the projection has a front wall, wherein the receiver back wall and the projection front wall face one another and wherein the ejection bolt is threadably engaged with one of the first part and the second part such that the bolt may be advanced against the receiver back wall or projection front wall to urge the first part away from the second part.

15. The coupling arrangement according to claim 1, wherein the first part is an anvil and the second part is a hub used for retaining the shaft of a jaw set.

16. A dovetail coupling arrangement for securing two removable parts along a coupling axis, wherein the coupling arrangement is suited to resist translational forces orthogonal to the longitudinal axis, the arrangement comprising:
  a) a first part having a receiver extending along the coupling axis, wherein the receiver has an inner wall with a receiver wall profile;
  b) a second part having a projection extending along the coupling axis and an outer wall with a projection wall profile, wherein a substantial portion of the outer wall of the projection corresponds to the inner wall of receiver such that the projection mates with the receiver with a slip fit;
  c) wherein the receiver of the first part and the projection of the second part are slidably receivable and directly connected with one another and, wherein the receiver profile and the projection profile define mating interlocking walls along the coupling axis to restrict movement of the projection within the receiver along directions orthogonal to the coupling axis;
  d) wherein when viewed along the coupling axis from the end, the projection profile has a dovetail shape with an outer bottom surface and a primary outer top surface, wherein the outer bottom and primary outer top surfaces are connected by opposing outer angled walls and wherein the receiver has an enclosed section with a profile similar to that of the projection with an inner bottom surface and a primary inner top surface with inner angled walls therebetween, such that when the first part and the second part are mated, each of the outer bottom surface, primary outer top surface, and the associated outer angled walls of the projection along at least a portion of the projection are entirely enclosed within the receiver; and
  e) a removable sleeve extending within the first part and the second part, wherein the sleeve is oriented in a direction generally orthogonal to the longitudinal axis to prevent relative movement between the first part and the second part along the coupling axis.

17. The dovetail coupling according to claim 16, further including an ejection bolt along the coupling axis for separating the first part from the second part when the first part and the second part are assembled.

18. The coupling arrangement according to claim 16, further including a threaded bolt extending through the sleeve and secured to the second part.

19. A dovetail coupling arrangement for securing two removable parts along a coupling axis which are supporting segments of a shaft having a shaft axis, wherein the coupling arrangement is suited to resist translational forces orthogonal to the coupling axis, the arrangement comprising:
  a) a first part having a bore extending along the shaft to accept the shaft and having a receiver extending along the coupling axis, wherein the coupling axis is parallel to the shaft axis and wherein the receiver has an inner wall with a receiver wall profile;
  b) a second part having a bore extending along the shaft to accept the shaft and having a projection extending along the coupling axis and an outer wall with a projection wall profile, wherein a substantial portion of the outer wall of the projection corresponds to the inner wall of receiver such that the projection mates with the receiver with a slip fit;
  c) wherein the receiver of the first part and the projection of the second part are slidably receivable and directly connected with one another and, wherein the receiver profile and the projection profile define mating interlocking walls along the coupling axis to restrict movement of the projection within the receiver along directions orthogonal to the coupling axis and wherein the bore in the first part and the bore in the second part are adapted to support the shaft;
  d) wherein when viewed along the coupling axis from the end, the projection profile has a dovetail shape with an outer bottom surface and a primary outer to surface, wherein the outer bottom and primary outer top surfaces are connected by opposing outer angled walls and wherein the receiver has an enclosed section with a profile similar to that of the projection with an inner bottom surface and a primary inner top surface with inner angled walls therebetween, such that when the first part and the second part are mated, each of the outer bottom surface, primary outer top surface, and the associated outer angled walls of the projection along at least a portion of the projection are entirely enclosed within the receiver; and e) at least one bolt extending within both the first part and the second part in a direction orthogonal to the coupling axis to prevent relative movement between the first part and the second part along the coupling axis.

20. The coupling arrangement according to claim 19, further including at least one sleeve extending within both the first part and the second part in a direction orthogonal to the coupling axis to prevent relative movement between the first part and the second part along the shaft axis, wherein the at least one sleeve is coaxial with one bolt such that the bolt retains the sleeve in position.

21. The coupling arrangement according to claim 19, further including at least one bolt extending within both the first part and the second part in a direction parallel to the coupling axis.

22. The coupling arrangement according to claim 21, further including at least one sleeve extending within both the first part and the second part in a direction parallel to the coupling axis, wherein the at least one sleeve is coaxial with one bolt such that the bolt retains the sleeve in position.

23. The coupling arrangement according to claim 19, further including an ejection bolt parallel to the coupling axis for separating the first part from the second part when the first part and the second part are assembled.

24. The coupling arrangement according to claim 19, wherein the at least one bolt is threaded.

25. A dovetail coupling arrangement for securing two removable parts along a coupling axis which are supporting segments of a shaft having a shaft axis, wherein the coupling arrangement is suited to resist translational forces orthogonal to the coupling axis, the arrangement comprising:

a) a first part having a bore extending along the shaft axis to accept the shaft and having a receiver extending along the coupling axis, wherein the coupling axis is parallel to the shaft axis and wherein the receiver has an inner wall with a receiver wall profile;

b) a second part having a bore extending along the shaft axis to accept the shaft and having a projection extending along the coupling axis and an outer wall with a projection wall profile, wherein a substantial portion of the outer wall of the projection corresponds to the inner wall of the receiver such that the projection mates with the receiver with a slip fit; and c) wherein the receiver of the first part and the projection of the second part are slidably receivable and directly connected with one another and, wherein the receiver profile and the projection profile define mating interlocking walls along the coupling axis to restrict movement of the projection within the receiver along directions orthogonal to the coupling axis and wherein the bore in the first part and the bore in the second part are adapted to accept and secure the shaft;

d) a first jaw and a second jaw each having a bore extending therethrough and wherein each of the first jaw bore and the second jaw bore is coaxial with the shaft axis; and e) wherein the shaft is mounted within the bores of the first jaw, second jaw, first part and second part, thereby permitting relative rotation between the first jaw and the second jaw about the shaft.

26. The coupling arrangement according to claim 25, wherein the first jaw and second jaw are both movable about the shaft.

27. The coupling arrangement according to claim 25, wherein the receiver has a back wall and the projection has a front wall, wherein the receiver back wall and the projection front wall face one another and wherein an ejection bolt is threadably engaged with one of the first part and the second part such that the bolt may be advanced against the receiver back wall or projection front wall to urge the first part away from the second part.

* * * * *

UNITED STATES PATENT AND TRADEMARK OFFICE
CERTIFICATE OF CORRECTION

PATENT NO. : 9,044,815 B2  Page 1 of 1
APPLICATION NO. : 13/139589
DATED : June 2, 2015
INVENTOR(S) : John R. Ramun It is certified that error appears in the above-identified patent and that said Letters Patent is hereby corrected as shown below:

In the Claims

Column 8, Line 62, Claim 19, delete "to" and insert -- top --

Signed and Sealed this
Twenty-fourth Day of November, 2015

Michelle K. Lee
*Director of the United States Patent and Trademark Office*